United States Patent
Meckler

Patent Number: 5,954,577
Date of Patent: Sep. 21, 1999

[54] AUTOMOTIVE BY-PASS AIR CLEANING AND PARTICULATE MOTOR VEHICLE INTERIOR AIR QUALITY SYSTEM

[76] Inventor: Milton Meckler, 930 20th St. #2, Santa Monica, Calif. 90403

[21] Appl. No.: 08/552,301
[22] Filed: Nov. 2, 1995
[51] Int. Cl.⁶ .................................................. B60H 3/06
[52] U.S. Cl. ................................ 454/75; 454/158; 55/473
[58] Field of Search ........................ 454/158, 75; 55/473

[56] References Cited

U.S. PATENT DOCUMENTS

| | | | |
|---|---|---|---|
| 3,853,512 | 12/1974 | Hayashi | 454/158 |
| 4,191,543 | 3/1980 | Peters | 55/473 |
| 4,666,478 | 5/1987 | Boissinot et al. | 55/279 |
| 4,696,225 | 9/1987 | Weller | 98/2.11 |
| 4,702,753 | 10/1987 | Kowalczyk | 454/158 |
| 5,076,821 | 12/1991 | Bruhnke et al. | 454/158 |
| 5,256,103 | 10/1993 | Abthoff et al. | 454/158 |
| 5,279,609 | 1/1994 | Meckler | 236/49.3 |
| 5,395,042 | 3/1995 | Riley et al. | 236/46 R |
| 5,433,266 | 7/1995 | Doi et al. | 165/29 |
| 5,448,891 | 9/1995 | Nakagiri et al. | 62/34 |
| 5,450,894 | 9/1995 | Inoue et al. | 165/43 |
| 5,486,138 | 1/1996 | Sorensen | 454/158 |
| 5,493,870 | 2/1996 | Kodama et al. | 62/155 |
| 5,516,330 | 5/1996 | Dechow et al. | 454/74 |
| 5,518,065 | 5/1996 | Asou et al. | 165/43 |
| 5,518,448 | 5/1996 | Madoglio et al. | 454/108 |
| 5,522,230 | 6/1996 | Shima et al. | 62/127 |
| 5,524,446 | 6/1996 | Hotta et al. | 62/179 |
| 5,528,900 | 6/1996 | Prasad | 62/175 |
| 5,529,536 | 6/1996 | Sizemore et al. | 454/157 |

Primary Examiner—Henry A. Bennett
Assistant Examiner—Derek S. Boles
Attorney, Agent, or Firm—Arnold, White & Durkee

[57] ABSTRACT

Disclosed are air circulation systems for vehicle heating and cooling system, especially for heating and cooling the passenger compartment and other pertinent compartments of motor vehicles, as well as trains, airplanes, etc. The invention more particularly concerns apparati and methods for improving the air quality in such systems through the use of filters for decontamination of air flows. The invention relates generally to apparati and methods for causing the air flow to pass through a decontamination module to clean the air. Preferred devices of the present invention controls the extent of such cleaning by a by-pass and damper arrangement, which apportions the flow between the module and the by-pass. Various bypass configurations having various flow characteristics are disclosed. The invention has application to both new vehicles as original equipment and older vehicles as added equipment.

124 Claims, 7 Drawing Sheets

AUTOMOTIVE BY-PASS AIR CLEANING AND PARTICULATE MOTOR VEHICLE INTERIOR AIR QUALITY SYSTEM

BACKGROUND OF THE INVENTION

1. Field of the Invention

This invention relates generally to air circulation systems for vehicle heating and cooling systems, especially for heating and cooling the passenger compartment and other pertinent compartments of motor vehicles. The invention more particularly concerns apparati and methods for improving the air quality in such systems. More specifically, the invention comprises apparatus and methods for causing the air flow to pass through a decontamination module to clean the air. Additionally, the invention controls the extent of such cleaning by a by-pass and damper arrangement, which apportions the flow between the module and the by-pass. The invention has application to both new vehicles as original equipment and older vehicles as added equipment.

2. Related Art

Air conditioning systems within moving vehicles generally serve two important functions. One function is to provide means for comfortable in-vehicle conditions for all vehicle occupants. Another function is to guarantee good visibility through all windows. In fact, many countries require by law that the heating function be capable of keeping the windows free of mist and ice. (e.g., within the European Community by Guideline EWG 78/317 and in the USA by Safety Standard MVSS 103).

Motor vehicles generally employ either a liquid cooled S1 or C1 engine or an air-cooled S1 or C1 engine.

Typically, in vehicles with liquid-cooled S1 or C1 engines, the interior is heated by the waste heat from the engine. In vehicles with air-cooled S1 or C1 engines, heat given off by the engine oil may also provide heat to the interior.

Typical vehicle heating and cooling systems comprise two major components. One component, the "air condition component," functions to heat, cool and supply air to the passenger compartment. Consequently, it includes a blower which circulates the air, a heater core for heating the air, and the evaporator core of a refrigeration unit for cooling the air. The second component, the "air distribution component," operates to distribute the air to various outlets within the passenger compartment. The distribution of the air may be controlled either manually or automatically. In either case, a series of doors or dampers is manipulated to direct the flow through the appropriate core. Additionally, a series of selection devices and switches activates the heater core or the air cooling evaporator core as desired. Further, an air inlet door leading to the blower is adjustable to supply air to the system solely from the atmosphere, to recirculate the air from the passenger compartment, or to provide a mixture of outside and recirculated air.

The air distribution component necessarily comprises ductwork and outlets within the passenger compartment. In general, the outlets may include floor outlets, outlets in or below the dashboard, and defroster outlets for the front windshield. Typically, warm air is delivered by the floor outlets and the defroster outlets. Cool air, on the other hand, generally flows from the dashboard outlets. As with the air condition component, a series of dampers, selected manually or automatically, routes the air supply to the appropriate outlets. Some outlets contain louvers which enable the passengers to direct the air flow from the outlets as desired.

For most purposes and in most vehicles, the conventional air conditioning systems described above perform quite satisfactorily. However, the condition of the environment both outside and inside the vehicle is an area of growing interest and concern. Of particular concern is the effect of contaminants within the environment on the vehicle's passengers. For example, many persons are allergic to pollens, spores and other products of nature. Additionally, industrial contaminants, such as chemical gases and vapors, also cause allergic reactions in many persons. Most persons, whether allergic or not, object strongly to strange or bad odors. Like the allergens discussed above, offensive odors may be natural or industrial in origin. For example, some people find the odor of upholstery installed in vehicles to be objectionable. Still other persons object to the smell of gasoline vapors and gases such as hydrogen sulfide, sulfur dioxide, and engine exhausts.

Typical air conditioning systems are not designed to deal with air contamination, although steps have recently been taken to address this problem. Modern automobile cabin air filtration systems that reduce the particulates entering the interior have been available in Europe for several years. (See AUTOMOTIVE ENGINEERING 58, May 1995) Recently, manufacturers have begun to adapt these filters to reduce odorous gases and vapors caused by exhaust fumes, industrial processes, farms (animals), and air conditioning systems. Because of the wide variety of odorous materials and sources, and because of the wide range of odor threshold levels for those materials, these filters generally employ activated carbon as the primary odor-reducing medium. The activated carbon operates to remove many of the undesired components through physical or chemical adsorption or catalytic reactions in the activated carbon pore structure. Whatever the choice of particulate adsorbent, the adsorbent is typically present as a bed through which the air is passed.

Other types of filters and threatening agents that have been mentioned include electrostatic filters, chemisorbents, catalytic adsorbents, and chemical neutralizers.

Activated carbon filters generally work well to remove higher-molecular-weight, low-vapor-pressure organic components via physical adsorption. However, for the efficiency of physical adsorption to be maximized, it must occur at relatively low temperatures. Unfortunately, many lower-molecular-weight compounds and highly volatile materials such as hydrogen sulfide, ammonia, and sulfur dioxide are not effectively removed by activated carbon via physical adsorption. To remedy this problem, chemical impregnants can be added to the activated carbon. Such chemical impregnants give the activated carbon chemical adsorption (chemisorption) or reaction properties.

Since chemisorption is essentially a chemical reaction, it is generally more effective at higher temperatures due to improved reaction rates. It is noted, however, that treatment of the activated carbon with impregnants may have an adverse effect on physical adsorption efficiency. As a result, producers of such filters have necessarily had to balance physical and chemical adsorption properties to provide maximum effectiveness for a wide range of compounds. Such concessions necessarily allow a number of undesired particulates and odors to enter the vehicle cabin.

It appears that air conditioning systems which employ the above-described filters channel all of the air circulating in the system through the filter without regard to the amount of contaminants in the air. Such use amounts to a costly and inefficient method of removing undesired particulates and odors in that the filters will necessarily need to be replaced more often and air circulation through the system may be less efficient causing a decrease in gas mileage, etc.

Another problem associated with systems currently in use is their inability to decontaminate recirculated air. Recirculated air is air which is drawn from the vehicle interior, travels through the vehicle's air conditioning system and is redistributed to the vehicle interior. Recirculated air contains no outside air. As such, these systems appear to be capable only of cleaning outside air entering the vehicle through the vehicle's air conditioning system. This causes a problem in providing complete occupant comfort in that offensive interior odors and particles, such as cigarette smoke or outgassing from carpet, etc., cannot be adequately removed.

SUMMARY OF THE INVENTION

The present invention in one principal aspect addresses the general problem of dealing with the reduction of air contamination in the circulating systems of vehicles. In a more specific aspect, the invention addresses the problems of increasing the efficiency and reducing the costs associated with current reduction methods. In another more specific aspect, the invention presents a system which activates and deactivates contaminant reduction mechanisms without introducing unpleasant pressure fluctuations in an air circulation system.

The present invention in one preferred aspect is designed to detect the contaminants entering the air flow in a vehicle interior and to react to such conditions by causing the air flow to pass through a decontamination module hereinafter described until the air is satisfactorily cleaned. Once the interior conditions have improved, the invention detects the satisfactory conditions and the air is no longer caused to pass through the decontamination module. The decontamination module is thereby activated only as needed.

The treating module of the present invention comprises an inlet conduit adapted to be connected into a vehicle's circulation system downstream of the blower; an outlet conduit adapted to be connected into the circulation system upstream of the blower; and a series of filters (See FIG. 1). The housing of the treating module can be made of painted steel, anodized aluminum or plastic (i.e., PVC, AVS or polystyrene) tubing arranged with companion 180° return bends to achieve serpentine pattern (in a single plane) for ease of attachment as compact assembly to bottom of interior dashboard or side of other available dashboard internal surface, etc. Annular space for treated air discharge is thereby provided between inside face of outer tubing wall and entering air to be treated extends uniformly and radially from centerline supply airflow after entering module inlet located as shown on attached drawing. The latter centerline airflow conduit boundary is defined by cylindrical surface of (inlet) face of prefilter cylindrical cartridge (through which recirculated (R), outside (0) or mixed (R/A) is first circulated prior to being further cleaned and filtered.) It is identified on FIG. 4 as inlet A. Cylindrical composite filter/air cleaner cartridge (also shown) provides the path through which inlet air is distributed radially throughout and uniformly subsequent filter and air cleaning media ultimately finding its way to an outer annular space defined by inside face of tubing wall and leaving (i.e., discharge) face of final filter as shown. Tubing is accordingly utilized for directing supply (i.e., untreated) air through a series flow arrangements of prefilter, air cleaner, and final filter, each section being separated by spacers as shown to maintain proper cartridge alignment within longitudinal tubular sections. Please note that 180° return bends have companion openings only for designated centerline flow area A (i.e., supply) or outer annular space exiting at outlet B as shown on attached diagram.

Composite filter and air cleaner cylindrical cartridge assembly is inserted by means of longitudinal spacers (not shown) which are attached to outside (i.e., cylindrical) face of final filter discharge permitting ease of entry and alignment with inside face of outer tube wall upon which cartridge remains in contact after being inserted into longitudinal tube sections. Above referenced composite cylindrical cartridge is prefabricated as an integral assembly to be inserted into longitudinal tubular sections and to mate with return bends and is secured together by means of above referenced spacer rings provided at approximately 6" on center along composite cylindrical filter/air cleaner cartridge assembly length.

It is intended that above referenced composite interior prefabricated filter/air cleaning cartridge assembly be configured so that it can be easily slipped into place in sections from either end while riding on longitudinally placed spacer fins that guide it upon insertion for treating predetermined airflow quantities.

In a preferred embodiment, the filters housed within the treating module include a prefilter, at least one air decontaminant to contact air flowing through the module, and an after filter. Acceptable decontaminants for use within the module vary physically and chemically and may rely on different properties for their effectiveness. Thus, the decontaminant used may be an adsorbent, absorbent, oxidizing agent or other chemical reactant, or an electrostatic or other filter.

In another preferred embodiment, the treating module of the present invention contains a plurality of decontaminants arranged to contact the air flow in sequence. Most preferably, the apparatus of the invention comprises a plurality of decontaminants disposed in annular rings or in series.

The decontaminants may be loaded into canisters or other suitable containers capable of being replaced when they lose their effectiveness. To the extent that they are regenerable, they may be regenerated in place or in separate facilities for that purpose. Electrostatic filters may be periodically removed and cleaned.

In another aspect, the present invention provides an apparatus for improving air quality in an air circulation system of a vehicle such as an automobile, truck, bus, airplane, etc. As stated earlier, the air circulation system of a typical vehicle includes a blower, an evaporator core, a heater core, and supply and return ducts between the blower and the interior of the vehicle. hI a preferred embodiment, the apparatus of the invention comprises a treating module having an inlet conduit adapted to be connected into the circulation system of the vehicle downstream of the blower, and an outlet conduit adapted to be connected into the air circulation system upstream of the blower (See FIG. 1). The treating module is thus connected across the blower of the air circulation system and by-passes the system.

In a preferred embodiment, the apparatus of the present invention further comprises a bypass conduit interconnecting the inlet and outlet conduits of the module, thereby by-passing the treating module. The apparatus of this preferred embodiment is also equipped with two independently activated dampers. The first of said dampers, the "bypass damper," operates to regulate flow of air through the bypass conduit. The second of said dampers, the "flow damper," operates to regulate the flow of air through the treating module of the apparatus. In this way, the bypass and flow dampers operate independently but cooperatively to provide a steady supply of air of improved quality.

The apparatus of the present invention in a further preferred embodiment comprises a pressure or velocity sensor adapted to sense pressure in the circulation system. Pressure and/or velocity sensors are typically but not necessarily located downstream of the evaporator core as shown in FIG. 1 and connected with companion electronic pressure type transducers to convert static or velocity pressure input signal to current output signal which will then be fed to intelligent electronic controller controlling damper 36. Furthermore, there is no requirement that typical flow or pressure sensors be required, and any type of sensor that can detect flow or pressure, even a hot wire anamometer, can be employed.

The pressure or velocity sensor is typically located downstream of the decontamination assembly in the supply air circuit, preferably upstream of the evaporator core. The pressure sensor is connected to a first controller which operates the bypass damper in response to the sensor and attempts to maintain a selected pressure in the circulation system.

The apparatus of the present invention further preferably comprises a contaminant sensor adapted to sense contamination in the system. Contaminant measuring elements are typically located in housing in which the gas molecules within treated air are catalytically oxidized (or reduced) on a heated sensor surface e.g., stannic oxide, thus changing the conductivity of the element. This change in resistance is converted electronically to a linear signal equivalent ranging on equivalent scale of a zero (i.e., poor) air quality reading to a 100% (or good) air quality reading. The indoor air quality (IAQ) sensor is calibrated to a specified voltage based on a preset output voltage corresponding to a known gas concentration as for example 800–1000 ppm methane at standard conditions, (e.g., 70° F., 50% RH). The IAQ sensor (comprising a housing with circuit board, etc.) is electrically interconnected as shown in FIG. 1.

The contaminant sensor is typically located in the same general area as the temperature sensor for the cabin or compartment. Additionally, the sensor is programmed to activate a second controller when the level of contamination is not acceptable. The second controller operates to close the flow damper when the level of contamination is acceptable and to open the flow damper when the level of contamination is not acceptable.

In a preferred embodiment, the apparatus of the present invention comprises both the pressure sensor in connection with the first controller and the contaminant sensor in connection with the second controller.

In another aspect, the present invention provides an apparatus for removing contamants from the air flow of an air circulation system of a vehicle. The air circulation system of a typical vehicle includes a blower, an evaporator core, a heater core, and supply and return ducts between the blower and the interior of the vehicle. The apparatus of the invention is designed to remove contaminants existing in the outside air surrounding the vehicle and those existing in the interior of the passenger compartment. As explained earlier, such contaminants may be airborne particles, including dust, pollen and cigarette smoke, and/or odorous gases and vapors, resulting, for example, from industrial processes, feedlots and exhaust systems.

More specifically, the apparatus of the invention comprises an untreated air inlet conduit and a treated air outlet conduit capable of being incorporated into a vehicle circulation system by means of connections on the discharge side and the intake side, respectively, of the blower; a treating module comprising at least one air decontaminant and connected to the inlet and outlet conduits; a bypass conduit, a bypass damper and a flow damper, wherein the bypass conduit interconnects the inlet and outlet conduits and bypasses the treating module. The bypass damper is positioned in the bypass conduit and operates to regulate the pressure of the air flow through the bypass conduit. The flow damper is positioned in the inlet or outlet conduit and operates to regulate the flow of air through the treating module.

In a preferred embodiment, the apparatus of the present invention will include a pressure sensor which is preferably positioned at a selected location within the air circulation system and which operates to detect pressures in the circulation system. The pressure sensor further connects to a first controller. The first controller operates the bypass damper in response to the pressure sensor.

In another embodiment, the apparatus of the present invention further preferably includes a contaminant sensor which is positioned in the same general location as the temperature sensor for the cabin. The contaminant sensor is activated by contaminant levels exceeding background preset levels and includes a second controller. The second controller operates the flow damper in response to the contaminant sensor. When the level of contamination is acceptable, the second controller causes the flow damper to close, and when the level of contamination is not acceptable, the second controller causes the flow damper to open. In addition to or in lieu of a contaminants sensor, the second controller may be actuated manually.

The apparatus of the present invention preferably includes both the above described pressure sensor in connection with the first controller and the above described contaminant sensor in connection with the second controller.

In still another aspect, the present invention provides a method of improving air quality in the air circulation system for heating and cooling the passenger compartment of a vehicle wherein the system includes a blower, which circulates air through ductwork past an air cooling evaporator and a heater. The method of the present invention includes monitoring the vehicle's air stream for contaminants to generate a first signal indicative of the presence of excessive contaminants. Upon indication of excessive contaminants in the air stream, the first signal causes at least a portion of the air stream to recycle from the blower discharge to the blower intake to bypass the remainder of the system. The recycled portion of the air stream then passes through a series of filters including at least one decontaminant prior to reaching the blower intake. As a result of passing through the series of filters, the recycled portion of the air stream is decontaminated prior to reaching the blower intake.

Preferably, where the vehicle has a constant speed fan motor, or a variable speed blower operating at or near peak conditions, the pressure in the air stream is monitored downstream from the blower discharge to generate a second signal indicative of excessive pressure. When the pressure is found to be excessive, the second signal causes a sufficient portion of the recycled portion of the air stream to bypass around the decontamination step, provided the contaminant sensor is not activated, so as to reduce the excessive pressure. Furthermore, where one contemplates the use of a constant speed blower, one may desire to control the air flow by controlling selected dampers within the bypass or which control air flow over the decontamination module. Control of these dampers would preferably be effected by means of a temperature, velocity or pressure sensor. This would give similar control over air flow velocity as would a variable speed fan motor, but without the sound annoyance associated with variable speed fans.

The system of the present invention controls the air quality within a vehicle substantially independently of air temperature. The system has application in a variety of vehicles including vehicles such as automobiles, trucks, buses, airplanes, etc. As explained earlier, the system in a broad sense comprises a treating module connected across the blower of the air circulation system and in parallel with a by-pass conduit. For particular advantages, the system will preferably include one or more independently activated dampers. One damper may operate as a "bypass damper," and another as a "flow damper." For example, a damper in a by-pass conduit and a second damper in series with the treating module operate cooperatively to provide a steady supply of air of improved quality as required by the independent controller to achieve a desired thermal balance within passenger cabin. The by-pass damper will operate primarily to reduce pressure fluctuations which might otherwise be caused by actuation of the decontamination assembly. The second or flow damper regulates flow through the treating zone; it is normally either open to a predetermined position or closed.

Where employed, the pressure sensor which actuates the bypass damper is located downstream of the decontamination assembly in the supply air circuit, and preferably upstream of the evaporator core. The pressure sensor, typically a pressure transducer, preferably detects pressures.

The flow damper may be operated manually but preferably operates in response to a contaminant sensor located in the cabin or passenger compartment. The contaminant sensor may be located in the same general location as the temperature sensor for the cabin. The contaminant sensor is activated by contaminant levels exceeding background preset levels to be maintained for acceptable cabin air quality. The contaminant sensor may comprise one or more sensors for one or more different contaminants.

The decontamination module can be designed to allow untreated air to enter via a center annulus cross section. The untreated air then passes in serial fashion through the above referenced concentric prefilter, decontaminant and after-filter. Treated air then exits to annular space available between the exposed outer surface of the after-filter and the inside of the plastic surface. The treated air then flows onto a predetermined discharge point into another hose section. As described earlier, the module housing and the prefabricated air cleaner/filter composite cartridge consist of a series of longitudinal (plastic) tubular sections which are then interconnected by 180° bends, arranged with a common defined center line and outer wall annular flow area as shown in attached drawing.

The decontamination assembly as herein disclosed may be installed in a motor vehicle by means of a "run around" connection to the evaporator blower of said motor vehicle, and positioned between the discharge side of the evaporator blower and its inlet side by means of two sections of lightweight flexible hose.

The treating module in one preferred embodiment comprises a series of concentric "tubes" or cylinders housing a concentric prefilter, decontaminant and after-filter. The treating module may comprise a single zone or a plurality of subzones containing one or more decontaminants each. The decontaminants may vary physically and chemically and may rely on different properties for their effectiveness. Thus, the decontaminants may be adsorbents, chemical react ants, electrostatic or other filters, etc.

A preferred form of decontaminant container comprises concentric lengths of plastic tubing joined at their ends by means of two-90 degree concentric fittings to form a 180 degree fitting to define a continuous serpentine flow path providing the same access to above described filtration or air cleaning media as configured in upstream or downstream paths. The flexible nature of the tubing enables a compact serpentine configuration that may be easily mounted and concealed below the instrument panel in the passenger compartment. At the same time the tubing may be in close proximity to the blower, thereby minimizing pressure losses.

Although the foregoing annular configuration is preferred, the present invention is in no way intended to be limited to such a configuration, as any type of decontamination module that will effect a removal of undesirable contaminants will find application in the practice of the present invention. Furthermore, the type of tubing or ducting employed in the construction and/or installation of the module will in no way be critical to the practice of more general aspects of the invention.

The decontaminants used in the invention may also be loaded into canisters or other suitable containers capable of being replaced when they lose their effectiveness. To the extent that they are regenerable, they may be regenerated in place or in separate facilities for that purpose. Electrostatic filters may be periodically removed and cleaned.

When a motor vehicle equipped with the invention passes through a locality where the outdoor air quality is unacceptable or when activities within cabin due for example to smoking, outgassing from carpet, or other interior surfaces when heated by the sun might irritate passengers, the invention is activated to "clean up" some combination of recirculated, cabin and/or outdoor air. After the air is thereby cleaned, the invention is deactivated, thus extending the useful life of particulate and air cleaning media and also reducing maintenance and servicing cost. This takes place without reducing installed blower capacity normally sized for cabin temperature control needs as hereinbefore described. Additionally, the decontamination module may be activated when the moving vehicle is stationary and unoccupied since power use is minimal.

It is contemplated that treating modules and related apparati in accordance with the invention will be applicable to any type of vehicle that employs an air circulation or air conditioning system with a blower and supply and return ducts, and is particularly preferred for use in connection with vehicles having both external air supply and internal air recirculation modes of operation. Examples include automobiles such as cars, trucks or buses. However, there is no reason why the present invention would not be applicable to any other vehicle having such an air system, even such diverse vehicles as an airplane, boat or train.

DESCRIPTION OF PREFERRED EMBODIMENTS

Figure 1:
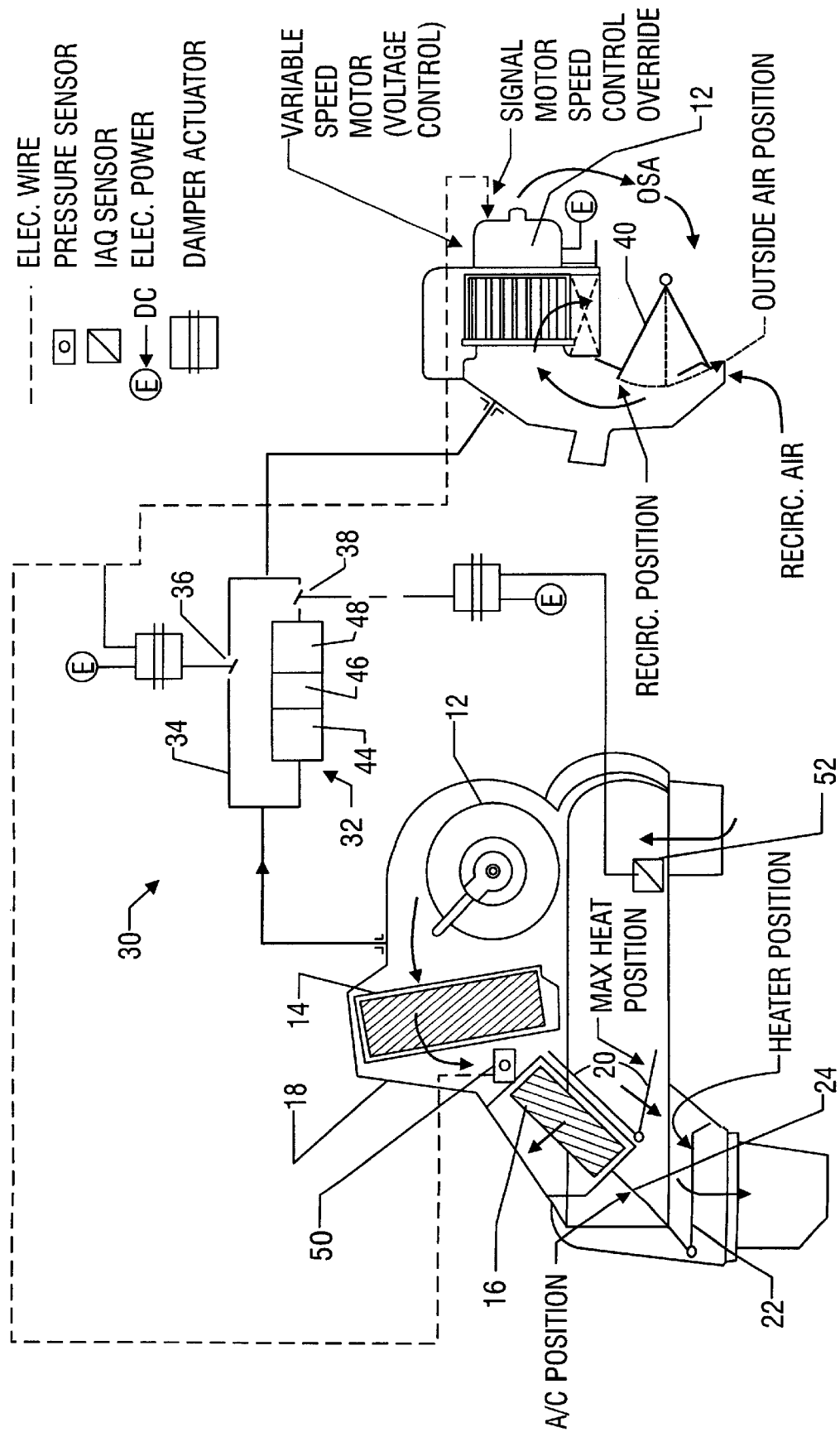
FIG. 1 is a schematic, partially cut away side view of a conventional heating and air conditioning system of a motor vehicle, which incorporates the system of the invention.

Referring to FIG. 1, there is shown a schematic, partially cut away side view of a conventional heating and cooling system which incorporates the invention. The system includes a blower 12, evaporator core 14, heater core 16, ductwork or housing 18, a modulating door 20 and a mode door 22. The modulating door 20 is shown in two limiting positions—an upper, maximum air conditioning position and a lower maximum heat position. The mode damper is also shown in two positions—an upper position for an air conditioning mode, and a lower position for a heating mode.

The heater core 16 is a typical heater core and normally comprises a tube-and-fin heater core. Liquid coolant flows through the tubes of the heater core and the radiator (not shown) simultaneously. The blower 12 forces air to flow between the fins. The heat output is typically controlled by regulating either the water flow or the air flow through the heater core. In regulating the air flow, the flow is divided upstream of the heater core 16 by the modulating damper 20 so that some of the divided air flows through the heater core 16 while the rest bypasses it. The two portions of the divided flows rejoin in a mixing chamber 24.

The extent to which air flow is divided is regulated by the continuously modulating damper 20. In this way, the amount of heat extracted becomes less dependent upon the operating condition of the engine and a change in temperature can be made rapidly. When the heating system is switched off, typically a shut-off valve operates to interrupt the flow of coolant through the heater core so as to eliminate any undesirable residual heating effects.

The blower 12 is normally a multiple-speed, a continuously variable speed or even constant speed electric blower. However, with increasing driving speed, ram-air pressure effects must also be considered. The minimum volumetric air flow rate for most full size sedans (e.g., 6 passenger sedans) will normally be on the order of about 100 to 300 cubic feet per minute.

Figure 2:
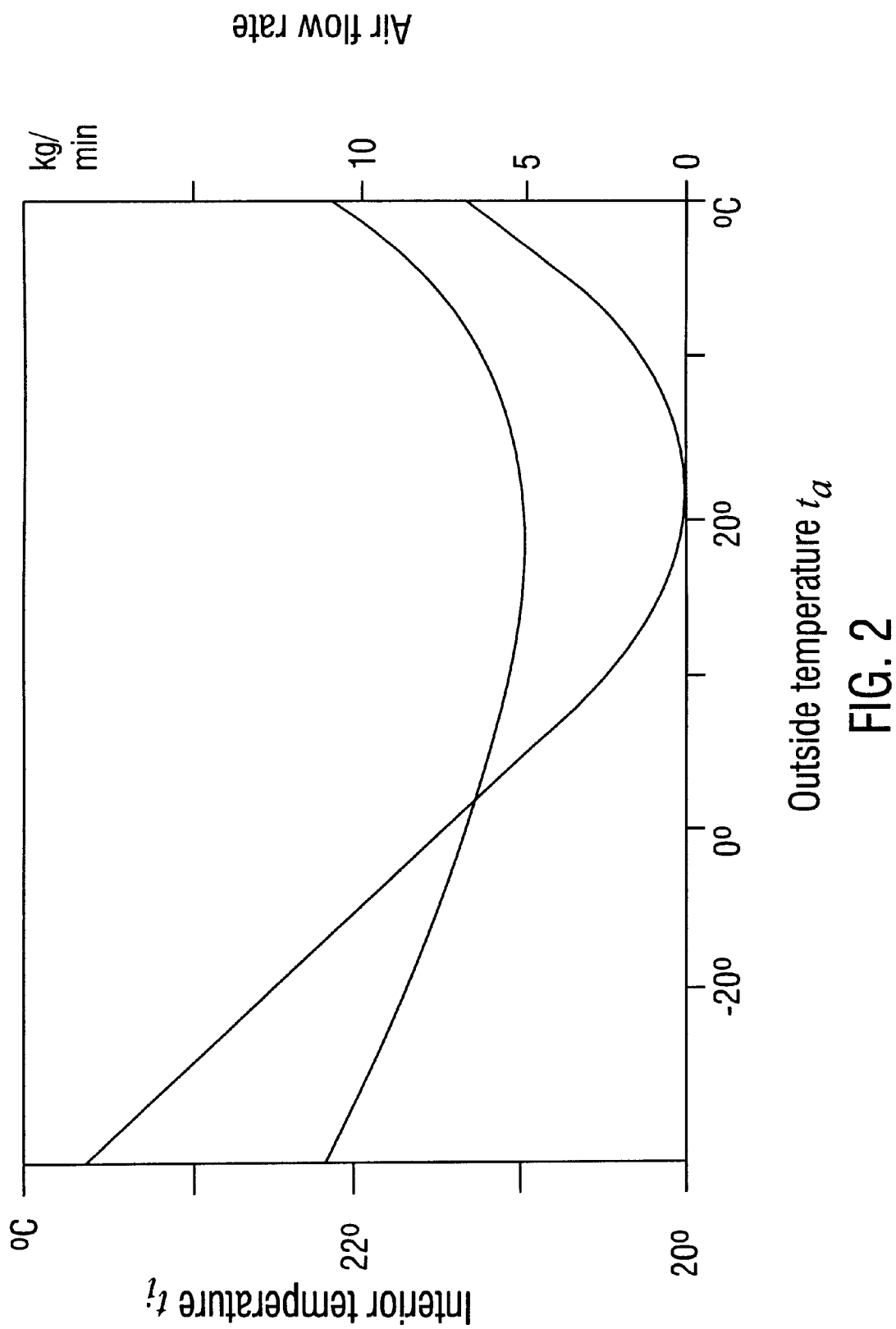
FIG. 2 is a chart showing the relationship interior temperature of a vehicle as a function of outside (atmospheric) temperature and air flow rate.

A comfortable interior climate is a function of inside temperature ($t_i$), outside temperature ($t_a$), air flow rate, and to a lesser extent solar radiation. (See FIG. 2 which illustrates a representative comfortable interior temperature and air flow rate as a function of outside temperature). These factors significantly influence the vehicle interior climate. Their relative impact varies greatly from vehicle to vehicle and can only be determined by means of actual tests.

Since a motor vehicle generally has a relatively small interior, widely varying air drafts and radiation effects through the windows often make comfortable heating and air-conditioning of the vehicle interior very difficult. Furthermore, achieving passenger comfort requires maintaining the footwell temperature approximately 7–15 degrees F. higher than in the upper body areas.

Outside temperatures above 68° F. require cooling the air to achieve satisfactory cabin comfort. Cooling is accomplished normally by a conventional vapor compression type refrigeration unit. Such systems currently use the new HCFC refrigerants (e.g., HCFC-134$a$) as the coolant. HCFC is an abbreviation which stands for "hydrochlorofluorocarbon" while CFC stands for "chlorofluorocarbon" both of which are used as refrigerants. According to the Montreal Protocol, CFC's are now in process of being phased out due to impacts on ozone atmospheric levels which present hazards for mankind. Currently refrigerant used to automotive use is HCFC-134A, which has been developed as a substitute for CFC refrigerant R-12.

The engine-driven compressor (not shown) compresses the vaporized refrigerant thereby raising its temperature. The vaporized refrigerant then flows into a condenser where it is cooled and returned to its liquid state. The heat added to the refrigerating compressor is transferred to the atmosphere. The liquid refrigerant cools the air flow in the air conditioning system of a vehicle by expanding and evaporating in the evaporator 14 shown in FIG. 1.

A simple automotive compression refrigerant cycle operates as follows:

1. A compressor raises the pressure of a suitable refrigerant vapor. Compressing the vapor increases its temperature automatically.
2. The hot vapor is piped into a condenser corresponding to the coils usually located before the automotive radiator, where it gives up its heat to the surrounding recirculating outdoor air. Since it is at high pressure, the vapor condenses into a liquid when it cools.
3. The liquid is piped into the evaporator core and flows through a capillary tube distributor located in the piping (which serves as the expansion valve). The pressure downstream of the expansion valve is much lower than that of the liquid upstream.
4. As the pressure has been reduced, the liquid evaporates in the evaporator core inside the ducting shown in FIG. 1. The liquid absorbs latent heat when it evaporates, so that it becomes colder than the air in the vehicle interior space.
5. The cold surface of the evaporator core cools the supply air to a predetermined dewpoint condition for humidity control after which it is reheated (i.e., is provided by downstream heater core) as needed to maintain the desired interior cabin comfort.
6. The vapor then flows back to the compressor, where it starts another cycle, etc.

The evaporator 14 is normally located in the intake air flow upstream of the heater core 16 because the cooling cycle cannot be adequately regulated by cycling the compressor "on and off." Consequently, continuously undercooled air is fed to the heater core where its temperature can be more precisely controlled using reheat. Climate control inside the moving vehicle can be manual or automatic. Manual control requires that the vehicle occupants activate appropriate switches or knobs located in or near the instrument panel (i.e., dashboard) area. Automatic climate control systems (ACC) are advantageous particularly in large vehicles with both heating and cooling systems, such as buses and airplanes, because it is difficult for occupants to control all the settings required for comfortable conditions. ACC systems with program selection capabilities automatically keep the inside temperature, air flow rate and air distribution at the proper levels. These variables continuously interact with one another, and cannot be arbitrily changed. The estimated air flow rate required for comfortable cooling of a full size sedan is approximately 300 cubic feet per minute (CFM).

An inside temperature control circuit normally forms the heart of the ACC system to detect all of the actuating variables and disturbances, as well as the temperature level selected by the vehicle occupants. The ACC system usually monitors these values to continuously calculate a set point value $t_i$ (see FIG. 2). The set-point temperature value is compared to the actual cabin temperature. The control unit employs the difference between the set-point value and the actual temperature to generate so called reference variables for heating, cooling and air flow rate control.

Another feature of the ACC system automatically activates mode door 22 for the appropriate pathway control needed for conditioning air distribution throughout passenger compartment or cabin depending upon the program which the vehicle occupants, driver or pilot have selected. The ACC system also typically allows for manual influence of the control circuits.

The ACC system achieves desired cabin temperature by controlling either the flow of warm coolant in the heat core or the flow of air. The air flow rate can be brought to the desired value by varying blower speed either continuously or in fixed speed increments. At high motor vehicle speed, ram air pressure increases the overall air flow rate. A control can be provided to initially reduce the blower speed (i.e., to zero) as driving speed increases. After blower speed reaches zero, the incoming air flow is typically limited by a throttle if the ram air pressure continues to increase.

Warm air exiting the ductwork 18 via the mode door 22 is generally distributed among the defroster, middle and footwell area nozzles in the passenger compartment either manually, according to the selected program or completely automatically. Automatic distribution incorporates programmed push buttons which, when pressed, distribute the air among the predetermined (i.e., usually three) levels according to preset values.

Defroster operation creates a special situation. In order to remove ice or mist as quickly as possible from windows, the temperature adjustment is conventionally set to maximum heat output, the blower must be set to maximum speed and the entire air flow must be directed upward. Systems which are either fully automatic or have preprogrammed buttons can establish these conditions with the press of a single button. When the temperature is above 32° F., the on board air-conditioning system described above removes moisture from the air.

In order to avoid drafts of cold air after cold starts in winter, normally an electronic interlock keeps the blower from running until the coolant reaches a warmer temperature provided the air distribution control is set to the defrost position and the temperature demand control is set to the "cooler region" part of the temperature range for both passenger cars and trucks. The climate control system is particularly complicated in buses. The interior of bus vehicles can also be subdivided into discrete zones whose temperatures can be controlled independently by electronically regulating the speed of a separate coolant pump in each zone where desired.

The heater outlet in the cabin is normally located at the bottom surface of the instrument panel near the centerline of the vehicle. Warm air is distributed to the left-hand and right-hand sides of the front floor and also under the front seat to heat the rear compartment. A unitized defroster nozzle is normally provided to deliver defrosting air to both sides of the windshield. It is shown attached to the top of the module near the centerline and to the lower windshield frame by appropriate means.

The air conditioning duct (or distributor) within the cabin typically is fastened to the rear of the instrument panel. It receives air through the mode door opening 24 and diverts the air to the left hand, center and right hand air conditioning outlets through a flexible air hose and lightweight plastic ducts. Normally up to four outlets are located in the instrument panel; one at the left side, two in the center and one at the right side. Each outlet provides an air stream whose direction may be controlled independently, often by rotation. Furthermore, a knob or lever generally located somewhere within the face of each outlet may be adjusted to provide the desired air direction. Air flow may also be stopped altogether from each outlet by moving the above referenced lever beneath the end outlets and/or beside the center outlets.

A moderate flow of cool air to the floor may be provided by two or more small plastic outlets located on the right side of the air conditioning distributor and generally on the rear of the left hand outlet extension. These outlets may also be rotated to obtain a more indirect flow of air to the floor area, when desired.

When entering a hot car and upon activating an ACC system, in a typical example, the blower 12 will go to "Max" airflow, corresponding to 100% cabin air recirculation. Unfortunately, in this situation, blower noise levels are generally high and often annoying to occupants. As the cabin interior begins to cool down, outdoor air is introduced and the blower noise will drop noticeably until 100% outdoor air is employed at a lower blower operating speed. Evaporator blower speed is usually varied by controlling the voltage to the blower. As discussed above, air flow is directed by means of a moveable mode door and/or dampers, and the air is typically directed either to outlets located in the instrument panel adjacent to passenger seating or to some predetermined combination of floor and panel outlets or to floor outlets as appropriate, depending upon manually selected programs or as programmed by an ACC system.

Since typical vehicle heating and cooling systems necessarily employ outside air to some extent, passing through areas with contaminated outside air can cause some degree of discomfort to passengers within the vehicle. Likewise, certain interior conditions, such as interior finishes, outgassing from carpet, smoking, etc., can release irritating particulates and/or odors and gaseous contaminants into the vehicle atmosphere. Typical motor vehicle heating and cooling systems cannot adequately remove these contaminants from the circulating air.

Also included in FIG. 1 is a decontamination assembly 30 of the invention. Assembly 30 comprises a decontaminant module, a bypass conduit 34, a bypass damper 36, and a two-position flow damper 38. The decontaminant module 32 is depicted schematically as comprising three zones or chambers: a prefilter 44, a decontaminant zone 46 and an after filter 48. Pre-filter media shall preferably be of high density glass micro fibers laminated to all glass woven mesh backing. The filter media will typically have an average efficiency of 25–30% in accordance with ASHRAE Standard 52–76. It will also typically have an average arrestance of 94–96% in accordance with that test standard and listed by Underwriters' Laboratories as Class 1.

Figure 4A:
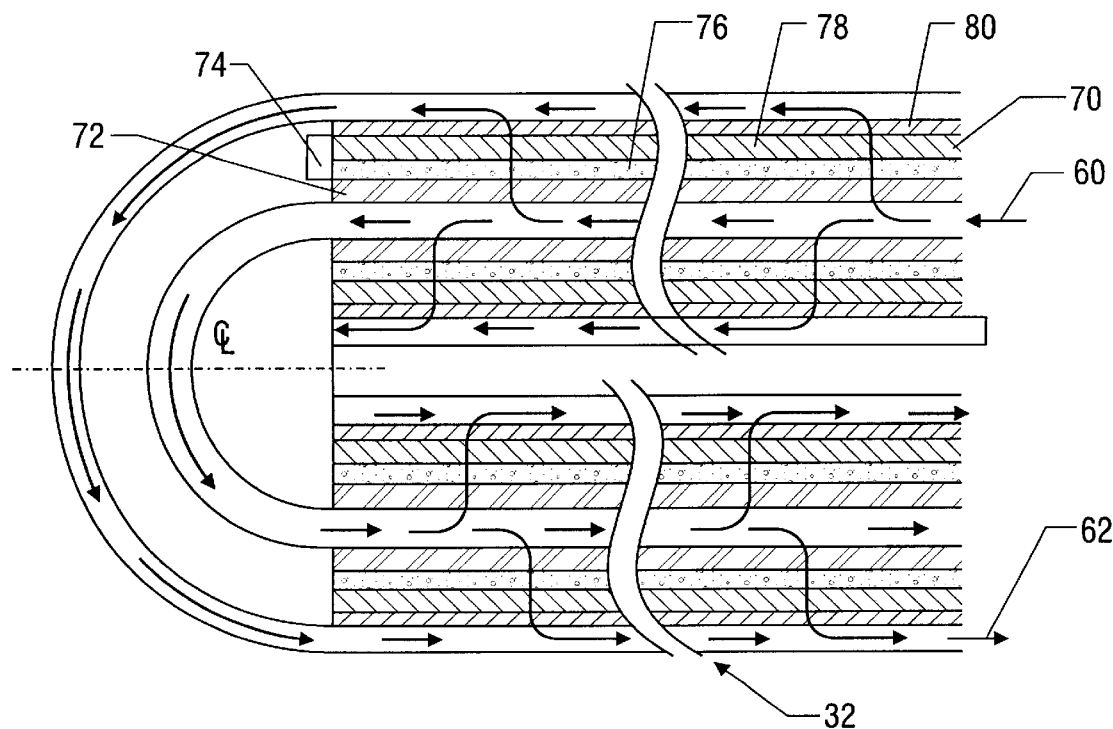
FIG. 4A is a schematic drawing of a particular form of decontaminant module for use in the present invention and illustrating the prefilter, air cleaner(s) (of activated charcoal and potassium permanganate, or permanganated alumina), and after filter and movement of air through the series of filters.
Figure 4B:
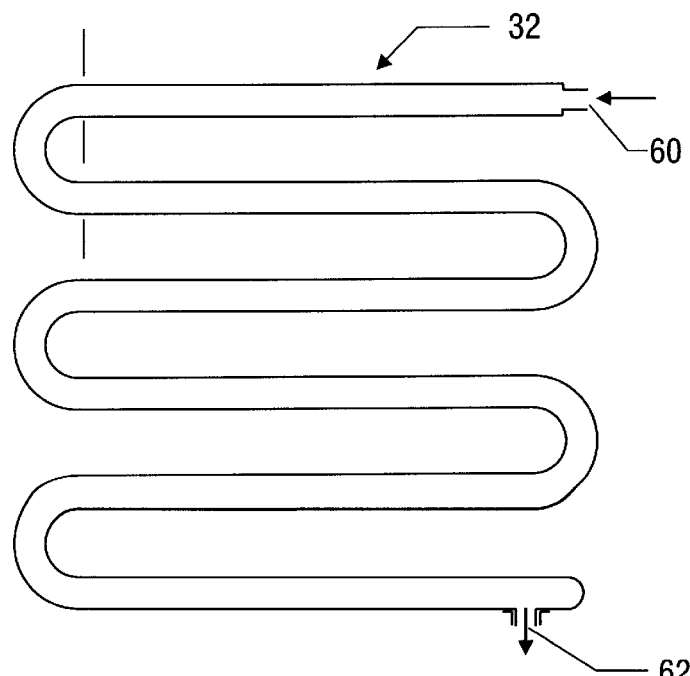
FIG. 4B is a schematic drawing illustrating a decontaminant assembly including 180 degree turns which serve as passageways for the inner and outer annular spaces of tubing lengths, and also serve to provide additional contact area for filtering and air cleaning.

One particular assembly that can be employed for decontamination is shown in FIG. 4A and FIG. 4B. Here is shown a decontamination assembly 32 having an air conduit inlet 60 and outlet 62. The air conduit will have permeability zones where the air will diffuse through layers of decontaminants disposed within spacer rings 70. The decontaminant zones may variously include a prefilter cartridge 72, an active decontaminant zone 74 comprising, for example, a first zone 76 of activated charcoal, and a second zone 78 of, for example, potassium permanganate or permanganated alumina, and an after filter 80. Note that in operation, the air diffuses through the prefilter cartridge, through the first and second decontaminant zones, into the after filter cartridge and ultimately out of the outlet 62. The decontaminant assembly may include turns (e.g., 180 degree turns) which serve as passageways for the inner and outer annular spaces of tubing lengths, and also serve to provide additional contact area for filtering and air cleaning. The tubing may be made of any desireable material, such as thin wall prefabs or other light weight plastic tubing.

Final—filter media will most preferably be of high density microfine glass fibers which are laminated to a non-woven synthetic backing to form a lofted filter blanket. The filter media will preferably also have an average efficiency of 90–95% in accordance with ASHRAE Standard 52–76, and an average arrestance of preferably not less than 99% on that standard and preferably listed by Underwriters' Laboratories as Class 2.

Activated carbon cylindrical air cleaners will preferably be of the full flow high velocity type containing activated carbon and so installed as to minimize the possibility of air bypass and containing internal separators to minimize the setting of the carbon. The activated carbon will typically have an activity rating of at least 50 minutes by the Standard Government Accelerated Chloropicrin Test.

As shown in FIG. 1, air flow from the blower 12 normally passes through the evaporator core 14 to the air mix door 20. In those instances when the air is neither cooled nor heated, the air mix door 20 and the mode door 22 are positioned such that the air bypasses the heater core and flows directly to the passenger compartment. This same flow pattern is employed when the air is cooled only, except that evaporation of refrigerant occurs in the evaporator core 14.

In those instances when the air is heated only, the air mix door 20 is positioned at least partially away from blocking flow to the heater core 16, and the mode door 22 is positioned in a heater position such that air from the heater core 16 can flow to the passenger compartment. The position of the air mix door 20 is movable to apportion the volume of air flowing through the heater core 16 relative to the volume bypassing the heater core. The two flow streams recombine in the mixing chamber 24.

The system will also preferably have an internal air quality sensor 52 that will operate to control decontamination in the interior cabin of the vehicle. When no decontamination is called for, actuation of dampers 36 and 38 will direct the entire air flow from the blower 12 to bypass the decontamination assembly 30. The dampers 36 and 38 are both closed at this time.

When decontamination is called for, for example, when the air quality sensor 52 senses a reduction in air quality within the cabin, the damper 38 is opened and air is drawn from the ductwork or housing 18 into the suction side of the blower 12. At the same time the bypass damper 36 is activated to be responsive to pressure fluctuations in the air stream to the passenger compartment. Thus, as mentioned earlier, a pressure transducer 50 is positioned immediately downstream of the evaporator core 14 to generate signals which are employed to control the positions of the bypass damper 36. The damper 36 opens to increase air flow to the blower 12 when high pressures are indicated by the sensor 50. Similarly, the damper 36 restricts such air flow when the pressures are sufficiently low to assure the required airflow rate needed for occupant comfort.

As described earlier, air flow through the decontamination assembly 30 continues without affecting the required air flow rate to the cabin or passenger compartment until the amount of contamination has decreased to an acceptable level without affecting the required airflow rate to cabin or passenger compartment as described above. In such an event, the pressure control may assume control of fan speed so that both cabin temperature control and decontamination control are achieved. For example, should a sudden call for decontamination result in an insufficient airflow rate to cabin or passenger compartment, pressure will drop and a signal would be transmitted by pressure sensor to immediately increase for speed to compensate for airflow being bypassed through damper 38 for required decontamination. The amount of contamination is determined by an air quality sensor positioned in the passenger compartment. The air quality sensor can be set to cause the damper 38 to open when contamination is detected at preset levels. Similarly, when contamination is determined to be below the preset levels, the damper 38 is closed, and the bypass damper is deactivated.

Figure 3:
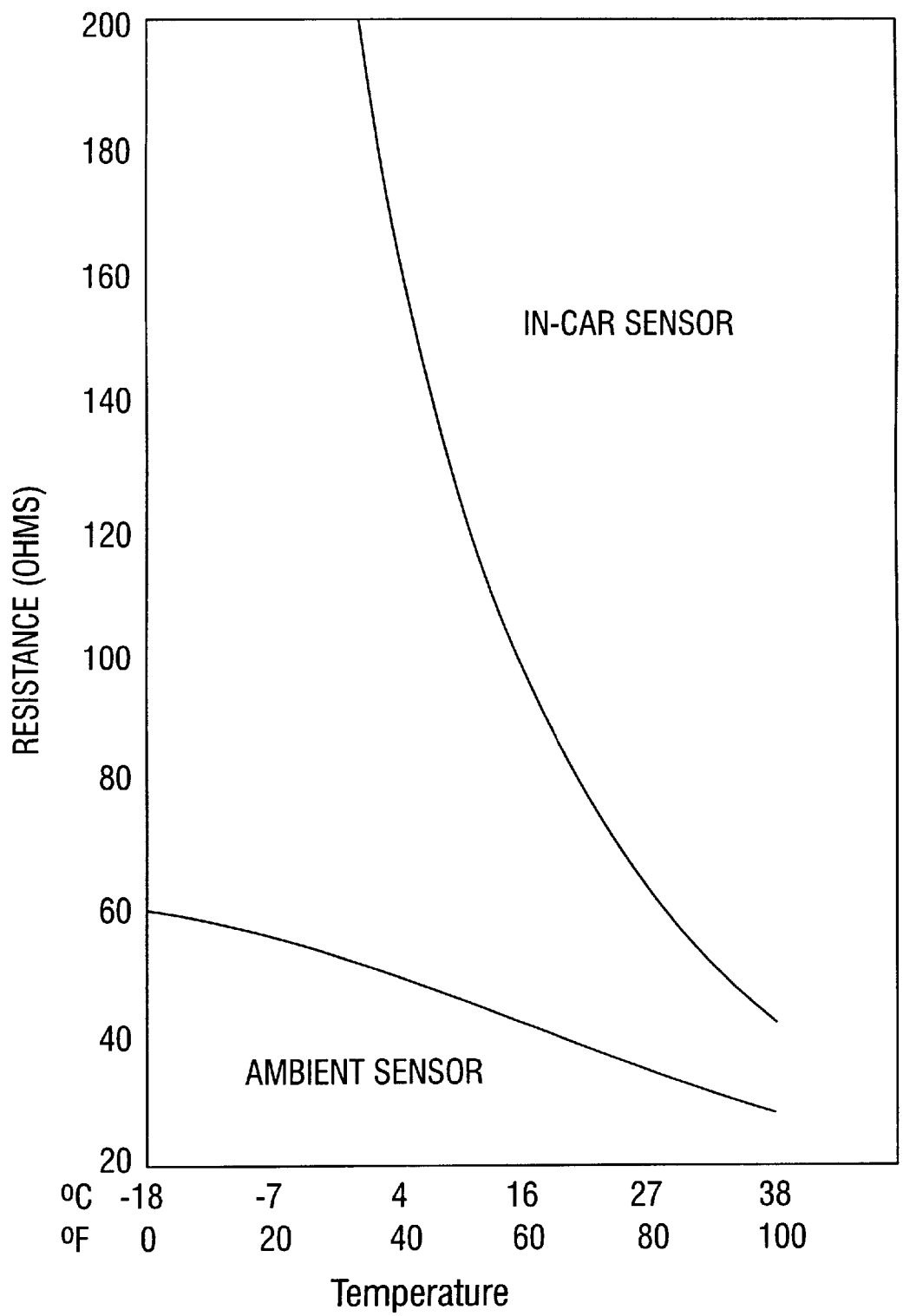
FIG. 3 is a chart showing typical performance characteristics of two thermistors—one for sensing ambient atmospheric temperatures and one for sensing passenger temperatures.

When an ACC system is furnished to provide automatic regulation of the cabin temperature independent of outdoor temperature changes (see FIG. 2), it generally will employ two sensors, one sensing treated "in-car" and the other sensing ambient (or outdoor) air conditions. Representative sensor characteristics for each are typically illustrated in FIG. 3 and are generally often of the thermistor type. Thermistors usually employ a resistor whose value changes significantly with temperature change. A small quantity of in-car air is continuously drawn over the in-car sensor at all times that the ACC control system is operational.

Shown in FIG. 5, FIG. 6, FIG. 7, FIG. 8, FIG. 9, FIG. 10, FIG. 11, FIG. 12 and FIG. 13 are numerous alternative embodiments to the arrangement of the decontaminant or treating assembly 30 of the invention with respect to the flow of air from the outside 56, or return or recirculated air from the cabin 58, through the blower 12. These different embodiments will find advantage depending upon the system contemplated. For example, certain systems will likely be preferred for retrofit or where the blower configuration or type is such that equalization of air flow through the blower versus through the treatment module becomes a consideration.

Figure 5:
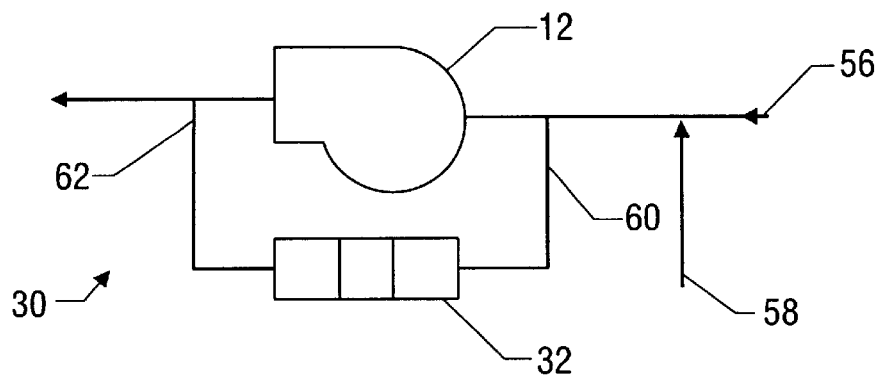
FIG. 5, FIG. 6, FIG. 7, FIG. 8, FIG. 9, FIG. 10, FIG. 11, FIG. 12 and FIG. 13 are schematic representations of various embodiments of the system of the present invention.

In FIG. 5, is shown a decontaminant or treatment module 32 connected to the air flow upstream of the blower 12 by means of the inlet conduit 60. As can be seen, in FIG. 5, the outlet conduit 62 of the treatment module is connected downstream of the blower.

Figure 6:
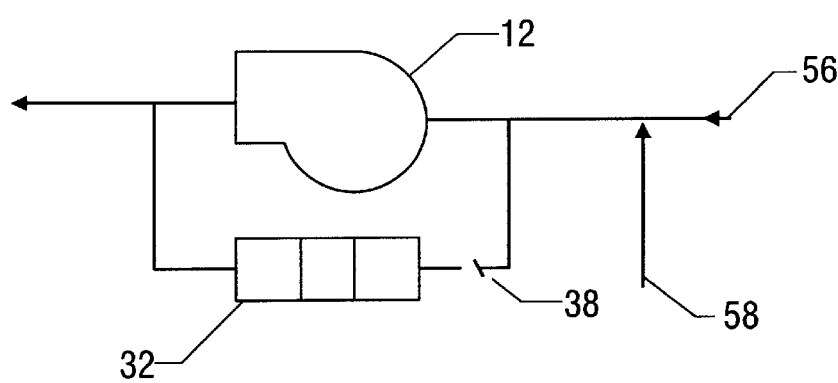

In FIG. 6 is shown a similar embodiment to that shown in FIG. 5, except for the addition of a conduit damper 38 positioned in the inlet conduit 60.

Figure 7:
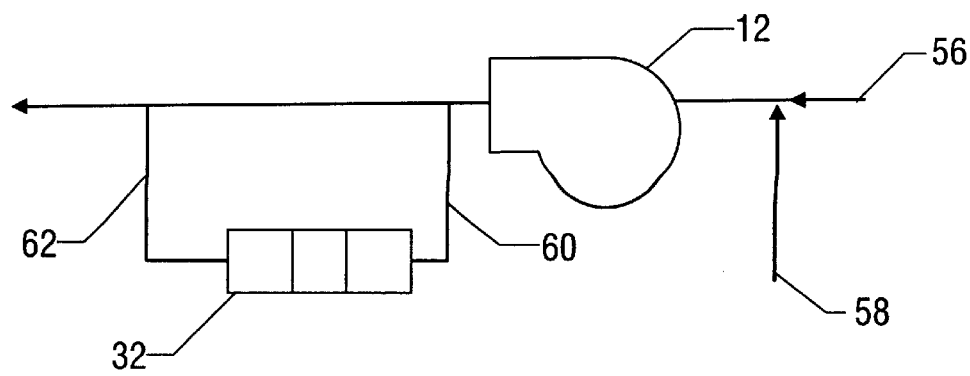
Figure 8:
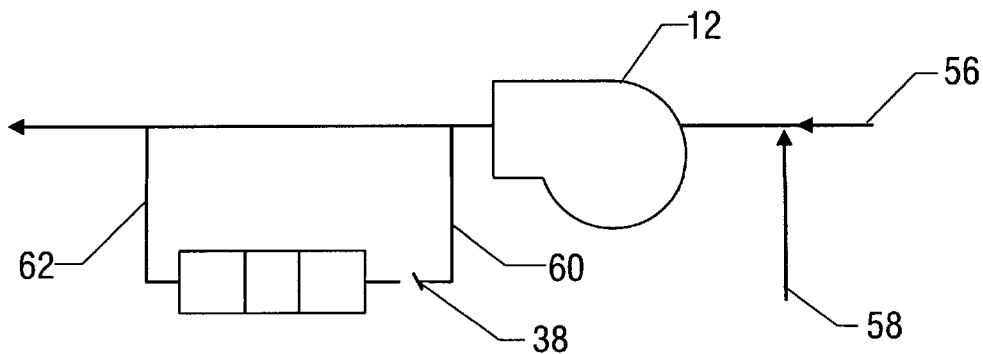

In FIG. 7, both the inlet and outlet conduits, 60 and 62, respectively, are positioned downstream of the blower 12. The embodiment of FIG. 8 is similar to that of FIG. 7, with the addition of a conduit damper 38.

Figure 9:
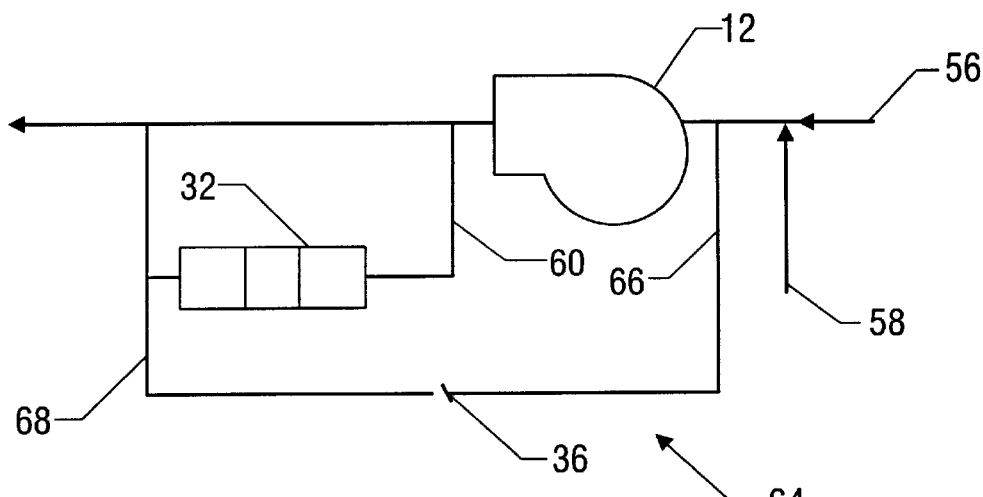

FIG. 9 introduces the concept of the bypass conduit 64 which defines an air flow path to bypass the treatment module 32. Here, the bypass conduit 64 has an inlet 66 and an outlet 68, wherein the inlet 66 is positioned upstream of the blower 12, and the outlet 68 is positioned downstream of the blower 12. However, note that the inlet conduit 60 of the treatment module 32 is positioned downstream of the blower.

Figure 10:
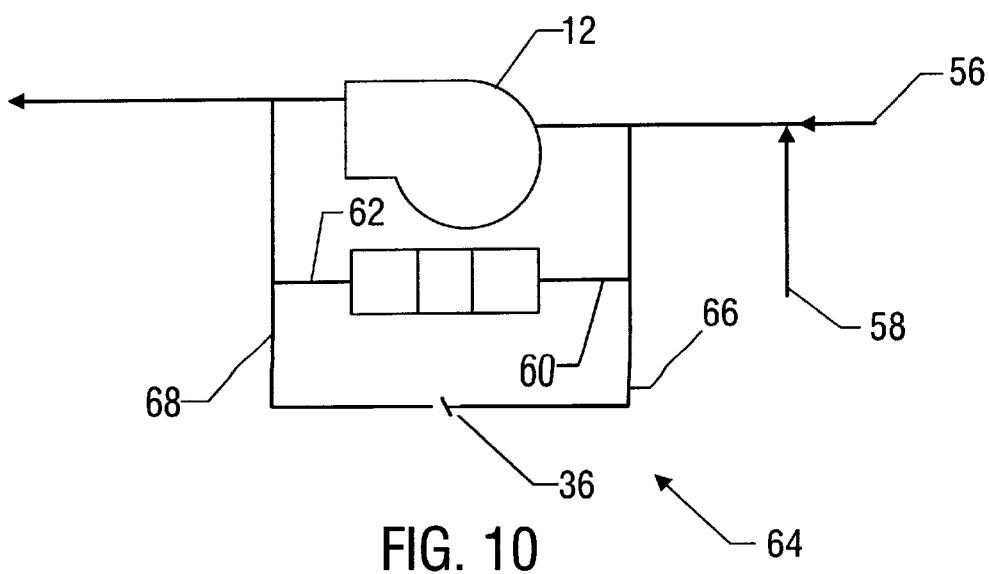

FIG. 10 shows an embodiment where both the inlet conduit 60 of the treatment module, and the inlet 66 of the bypass conduit 64 are positioned upstream of the blower, whereas the outlet conduit 62 and outlet 68 of the bypass conduit are positioned downstream of the blower. Note the presence of a bypass damper 36, which will effect a retardation of air flow through the bypass when actuated.

Figure 11:
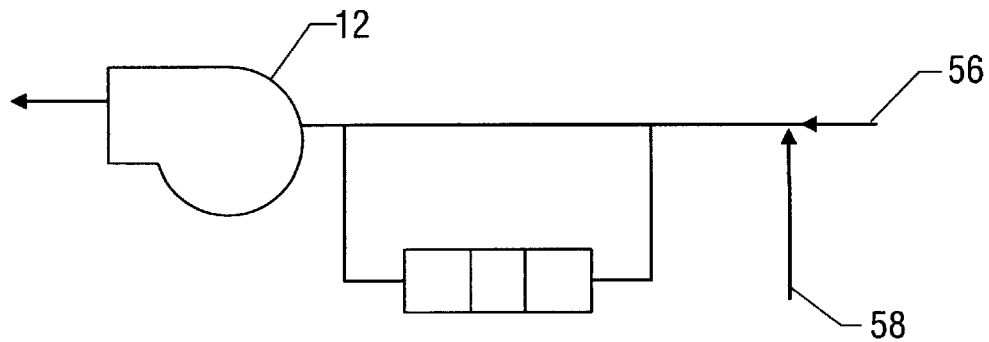
Figure 12:
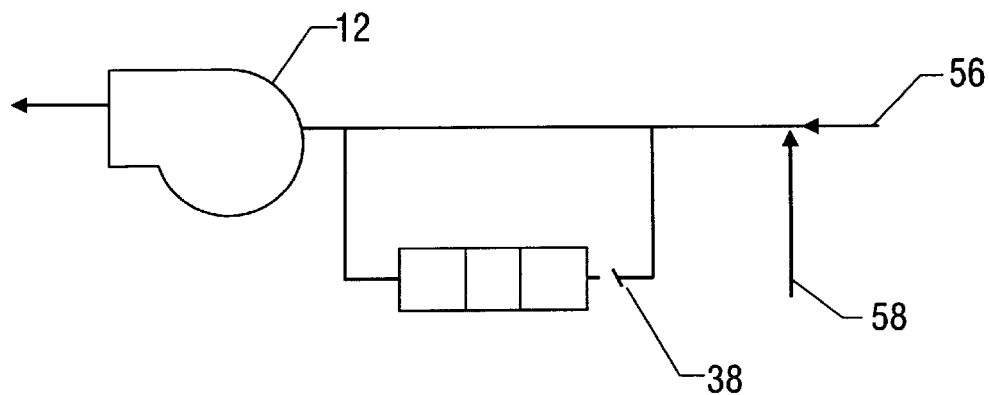

FIG. 11 depicts the positioning of the treatment module and inlet and outlet conduits fully upstream of the blower, and FIG. 12 demonstrates the same configuration with the addition of a damper 38.

Figure 13:
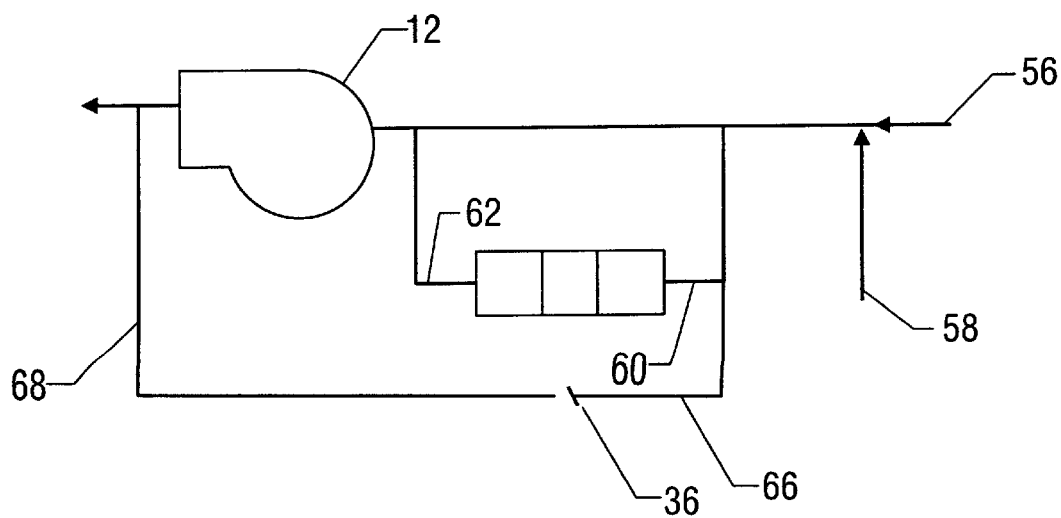

FIG. 13 demonstrates a configuration where the inlet conduit 60 and inlet 66 to the bypass are positioned upstream of the blower, as is the outlet conduit 62. However, here the outlet 68 of the bypass is positioned downstream of the blower.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangements of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed:

1. Apparatus for improving air quality in an air circulation system of a vehicle, said air circulation system having a blower and supply and return ducts between the blower and the interior of the vehicle, the apparatus comprising:
   a treating module having an inlet conduit and an outlet conduit, wherein said inlet conduit and outlet conduit are adapted to be connected into said circulation system upstream of said blower; and
   at least one air decontaminant disposed within said treating module to contact air flowing through the treating module;
      said treating module further comprising a bypass conduit that defines an air flow path that bypasses the treating module, wherein the bypass conduit has an inlet and an outlet.

2. The apparatus of claim 1, further comprising a conduit damper positioned in said inlet or outlet conduit operable to regulate flow of air therein.

3. The apparatus of claim 1, wherein the inlet of the bypass conduit is adapted to be positioned upstream of the blower and the outlet of the bypass conduit is adapted to be positioned downstream of the blower.

4. The apparatus of claim 1, wherein both the inlet and the outlet of the bypass conduit are adapted to be positioned downstream of the blower.

5. The apparatus of claim 1, wherein both the inlet and the outlet of the bypass conduit are adapted to be positioned upstream of the blower.

6. The apparatus of claim 1, having a bypass damper operable to regulate the flow of air through the bypass conduit.

7. The apparatus of claim 6, which further comprises a pressure or velocity sensor adapted to sense air pressure or velocity in the circulation system and a first controller responsive to said sensor to operate said bypass damper.

8. The apparatus of claim 6, which further comprises a contaminant sensor adapted to sense contamination in said system and a second controller operable in response to said contaminant sensor to close said conduit damper when the level of contamination is acceptable and to open said conduit damper when the level of contamination is not acceptable.

9. The apparatus of claim 1 wherein at least one decontaminant comprises a particulate decontaminant.

10. The apparatus of claim 1 wherein at least one decontaminant comprises an odor-reducing decontaminant.

11. The apparatus of claim 1 wherein at least one decontaminant comprises an adsorbent.

12. The apparatus of claim 1 wherein at least one decontaminant comprises an oxidizing agent.

13. The apparatus of claim 1 wherein at least one decontaminant comprises an electrostatic or ionization filter.

14. The apparatus of claim 1 wherein there are a plurality of decontaminants arranged to contact the air flow in sequence.

15. The apparatus of claim 11 wherein the decontaminants are disposed in annular rings.

16. The apparatus of claim 17 wherein the decontaminants are disposed in series.

17. The apparatus of claim 1, wherein the inlet of the bypass conduit is adapted to be positioned downstream of said blower, and the outlet of the bypass conduit is adapted to be positioned upstream of said blower.

18. Apparatus for removing contaminants from the air circulation system of a vehicle which circulates air to the passenger compartment of the vehicle comprising:
   a blower positioned within said air circulation system;
   supply and return ducts connecting said blower to the passenger compartment;
   an untreated air inlet conduit adapted to be connected into said circulation system downstream of said blower and a treated air outlet conduit adapted to be connected into said circulation system downstream of said blower;
   a treating module connected to said inlet conduit and said outlet conduit for treating air flowing there through;
   at least one air decontaminant disposed within said treating module to contact air flowing through the treating module; and
   a bypass conduit interconnecting said inlet and outlet conduits, wherein said bypass conduit is in parallel with said treating module and bypasses said treating module.

19. The apparatus of claim 18, wherein the inlet and outlet conduits are positioned within a return duct from the passenger compartment.

20. The apparatus of claim 18, wherein the inlet and outlet conduits are positioned within a supply duct to the passenger compartment.

21. The apparatus of claim 18, wherein the inlet conduit is positioned within a return duct and outlet conduit is positioned within a supply duct.

22. The apparatus of claim 18, further comprising a pressure sensor positioned in said circulation system downstream of said outlet conduit operable to detect static pressures within said air circulation system.

23. The apparatus of claim 18, further comprising a contaminant sensor positioned within the passenger compartment operable to detect contaminant levels within said vehicle.

24. The apparatus of claim 22, further comprising a bypass damper positioned in said bypass conduit operable to regulate flow of air through the bypass conduit in response to said pressure sensor, and a first controller responsive to said pressure sensor to operate said bypass damper.

25. The apparatus of claim 18, further comprising a flow damper positioned in said inlet or outlet conduit manually operable from said passenger compartment to regulate flow of air through said treating module.

26. The apparatus of claim 18 wherein the decontaminant comprises a particulate decontaminant.

27. The apparatus of claim 18 wherein the decontaminant comprises an odor-reducing decontaminant.

28. The apparatus of claim 18 wherein at least one decontaminant comprises an adsorbent.

29. The apparatus of claim 18 wherein at least one decontaminant comprises an oxidizing agent.

30. The apparatus of claim 18 wherein at least one decontaminant comprises an electrostatic or ionization filter.

31. The apparatus of claim 18 wherein there are a plurality of decontaminants arranged to contact the air flow in sequence.

32. The apparatus of claim 31 wherein the decontaminants are disposed in annular chambers.

33. The apparatus of claim 31 wherein the decontaminants are disposed in series.

34. A treating assembly for removing contaminants from the air circulation system of a vehicle, such circulation system including a blower and supply and return ducts between the blower and the interior of the vehicle, the treating assembly comprising:
   a module adapted to contain an air decontaminant and having an inlet and an outlet;
   a prefilter interconnecting the inlet into the circulation system downstream of the blower; and
   an after filter interconnecting the outlet into the suction side of the blower.

35. The treating assembly of claim 34 wherein the decontaminant comprises a particulate decontaminant.

36. The treating assembly of claim 34 which further comprises a flow damper operable to regulate the flow of air through the module and the filters.

37. The treating assembly of claim 36 which further comprises a bypass conduit arranged to bypass flow of air around said module and said filters, and a bypass damper in the bypass conduit operable to regulate the flow of air through the bypass conduit.

38. A method of improving air quality in the air circulation system for heating and cooling the passenger compartment of a vehicle wherein the system includes a blower which circulates air through ductwork past an air cooling evaporator and a heater, said method comprising:
   (a) sensing the air stream for contaminants to generate a first signal indicative of the presence of excessive contaminants;
   (b) recycling at least a portion of the air stream from the blower discharge to the blower intake to bypass the remainder of said system in response to such first signal;
   (c) causing the recycled portion of the air stream to pass through at least one filter including at least one decontaminant prior to reaching the blower intake;
   (d) reducing the contamination of the recycled portion of the air stream prior to reaching the blower intake;
   (e) sensing the static pressure in the air stream downstream from the blower discharge to generate a second signal indicative of excessive static pressure; and
   (f) bypassing a sufficient portion of the recycled portion of the air stream around the decontamination step in response to said second signal to reduce such excessive pressure.

39. Apparatus for improving air quality in an air circulation system of a vehicle, said air circulation system having a blower and supply and return ducts between the blower and the interior of the vehicle, the apparatus comprising:
   a treating module having an inlet conduit adapted to be connected into said circulation system upstream or downstream of said blower, and an outlet conduit adapted to be connected into said circulation system upstream or downstream of said blower; and
   at least one air decontaminant disposed within said treating module to contact air flowing through the treating module;
   said treating module further comprising a bypass conduit that defines an air flow path that bypasses the treating module, wherein the bypass conduit has an inlet adapted to be positioned upstream of the blower and an outlet adapted to be positioned downstream of the blower.

40. The apparatus of claim 39, wherein both the inlet conduit and the outlet conduit of the treating module are adapted to be positioned upstream of said blower.

41. The apparatus of claim 39, wherein the inlet conduit of the treating module is adapted to be positioned upstream of said blower, and the outlet conduit is adapted to be positioned downstream of said blower.

42. The apparatus of claim 39, wherein both the inlet conduit and the outlet conduit of the treating module are adapted to be positioned downstream of said blower.

43. The apparatus of claim 39, wherein the inlet conduit of the treating module is adapted to be positioned downstream of said blower, and the outlet conduit is adapted to be positioned upstream of said blower.

44. The apparatus of claim 39, wherein the inlet conduit is adapted to be positioned upstream of the blower, and the outlet conduit is adapted to be positioned downstream of the blower.

45. The apparatus of claim 39, wherein the inlet conduit is adapted to be positioned downstream of the blower, and the outlet conduit is adapted to be positioned upstream of the blower.

46. The apparatus of claim 39, further comprising a conduit damper positioned in said inlet or outlet conduit operable to regulate flow of air therein.

47. The apparatus of claim 39, having a bypass damper operable to regulate the flow of air through the bypass conduit.

48. The apparatus of claim 47, which further comprises a pressure or velocity sensor adapted to sense air pressure or velocity in the circulation system and a first controller responsive to said sensor to operate said bypass damper.

49. The apparatus of claim 47, which further comprises a contaminant sensor adapted to sense contamination in said system and a second controller operable in response to said contaminant sensor to close said conduit damper when the level of contamination is acceptable and to open said conduit damper when the level of contamination is not acceptable.

50. The apparatus of claim 39 wherein at least one decontaminant comprises a particulate decontaminant.

51. The apparatus of claim 39 wherein at least one decontaminant comprises an odor-reducing decontaminant.

52. The apparatus of claim 39 wherein at least one decontaminant comprises an adsorbent.

53. The apparatus of claim 39 wherein at least one decontaminant comprises an oxidizing agent.

54. The apparatus of claim 39 wherein at least one decontaminant comprises an electrostatic or ionization filter.

55. The apparatus of claim 39 wherein there are a plurality of decontaminants arranged to contact the air flow in sequence.

56. The apparatus of claim 49 wherein the decontaminants are disposed in annular rings.

57. The apparatus of claim 55 wherein the decontaminants are disposed in series.

58. Apparatus for improving air quality in an air circulation system of a vehicle, said air circulation system having a blower and supply and return ducts between the blower and the interior of the vehicle, the apparatus comprising:

a treating module having an inlet conduit adapted to be connected into said circulation system upstream or downstream of said blower, and an outlet conduit adapted to be connected into said circulation system upstream or downstream of said blower; and at least one air decontaminant disposed within said treating module to contact air flowing through the treating module;

said treating module further comprising a bypass conduit that defines an air flow path that bypasses the treating module, wherein the bypass conduit has an inlet and an outlet adapted to be positioned upstream of the blower.

59. The apparatus of claim 58, wherein both the inlet conduit and the outlet conduit of the treating module are adapted to be positioned upstream of said blower.

60. The apparatus of claim 58, wherein the inlet conduit of the treating module is adapted to be positioned upstream of said blower, and the outlet conduit is adapted to be positioned downstream of said blower.

61. The apparatus of claim 58, wherein both the inlet conduit and the outlet conduit of the treating module are adapted to be positioned downstream of said blower.

62. The apparatus of claim 58, further comprising a conduit damper positioned in said inlet or outlet conduit operable to regulate flow of air therein.

63. The apparatus of claim 58, having a bypass damper operable to regulate the flow of air through the bypass conduit.

64. The apparatus of claim 63, which further comprises a pressure or velocity sensor adapted to sense air pressure or velocity in the circulation system and a first controller responsive to said sensor to operate said bypass damper.

65. The apparatus of claim 63, which further comprises a contaminant sensor adapted to sense contamination in said system and a second controller operable in response to said contaminant sensor to close said conduit damper when the level of contamination is acceptable and to open said conduit damper when the level of contamination is not acceptable.

66. The apparatus of claim 58 wherein at least one decontaminant comprises a particulate decontaminant.

67. The apparatus of claim 58 wherein at least one decontaminant comprises an odor-reducing decontaminant.

68. The apparatus of claim 58 wherein at least one decontaminant comprises an adsorbent.

69. The apparatus of claim 58 wherein at least one decontaminant comprises an oxidizing agent.

70. The apparatus of claim 58 wherein at least one decontaminant comprises an electrostatic or ionization filter.

71. The apparatus of claim 58 wherein there are a plurality of decontaminants arranged to contact the air flow in sequence.

72. The apparatus of claim 65 wherein the decontaminants are disposed in annular rings.

73. The apparatus of claim 71 wherein the decontaminants are disposed in series.

74. The apparatus of claim 58, wherein the inlet conduit of the treating module is adapted to be positioned downstream of said blower, and the outlet conduit is adapted to be positioned upstream of said blower.

75. Apparatus for improving air quality in an air circulation system of a vehicle, said air circulation system having a blower and supply and return ducts between the blower and the interior of the vehicle, the apparatus comprising:

a treating module having an inlet conduit adapted to be connected into said circulation system downstream of said blower, and an outlet conduit adapted to be connected into said circulation system upstream of said blower; and at least one air decontaminant disposed within said treating module to contact air flowing through the treating module;

said treating module further comprising a bypass conduit that defines an air flow path that bypasses the treating module, wherein the bypass conduit has an inlet and an outlet.

76. The apparatus of claim 75, further comprising a conduit damper positioned in said inlet or outlet conduit operable to regulate flow of air therein.

77. The apparatus of claim 75, wherein the inlet of the bypass conduit is adapted to be positioned upstream of the blower and the outlet of the bypass conduit is adapted to be positioned downstream of the blower.

78. The apparatus of claim 75, wherein both the inlet and the outlet of the bypass conduit are adapted to be positioned downstream of the blower.

79. The apparatus of claim 75, wherein both the inlet and the outlet of the bypass conduit are adapted to be positioned upstream of the blower.

80. The apparatus of claim 75, having a bypass damper operable to regulate the flow of air through the bypass conduit.

81. The apparatus of claim 80, which further comprises a pressure or velocity sensor adapted to sense air pressure or velocity in the circulation system and a first controller responsive to said sensor to operate said bypass damper.

82. The apparatus of claim 80, which further comprises a contaminant sensor adapted to sense contamination in said system and a second controller operable in response to said contaminant sensor to close said conduit damper when the level of contamination is acceptable and to open said conduit damper when the level of contamination is not acceptable.

83. The apparatus of claim 75 wherein at least one decontaminant comprises a particulate decontaminant.

84. The apparatus of claim 75 wherein at least one decontaminant comprises an odor-reducing decontaminant.

85. The apparatus of claim 75 wherein at least one decontaminant comprises an adsorbent.

86. The apparatus of claim 75 wherein at least one decontaminant comprises an oxidizing agent.

87. The apparatus of claim 75 wherein at least one decontaminant comprises an electrostatic or ionization filter.

88. The apparatus of claim 75 wherein there are a plurality of decontaminants arranged to contact the air flow in sequence.

89. The apparatus of claim 82 wherein the decontaminants are disposed in annular rings.

90. The apparatus of claim 88 wherein the decontaminants are disposed in series.

91. The apparatus of claim 58, wherein the inlet conduit is adapted to be positioned upstream of the blower, and the outlet conduit is adapted to be positioned downstream of the blower.

92. Apparatus for removing contaminants from the air circulation system of a vehicle which circulates air to the passenger compartment of the vehicle comprising:

a blower positioned within said air circulation system;

supply and return ducts connecting said blower to the passenger compartment;

an untreated air inlet conduit adapted to be connected into said circulation system upstream of said blower, and a treated air outlet conduit adapted to be connected into said circulation system downstream of said blower;

a treating module connected to said inlet conduit and said outlet conduit for treating air flowing there through;

at least one air decontaminant disposed within said treating module to contact air flowing through the treating module; and a bypass conduit interconnecting said inlet and outlet conduits, wherein said bypass conduit is in parallel with said treating module and bypasses said treating module.

93. The apparatus of claim 92, wherein the inlet and outlet conduits are positioned within a return duct from the passenger compartment.

94. The apparatus of claim 92, wherein the inlet and outlet conduits are positioned within a supply duct to the passenger compartment.

95. The apparatus of claim 92, wherein the inlet conduit is positioned within a return duct and the outlet conduit is positioned within a supply duct.

96. The apparatus of claim 92, further comprising a pressure sensor positioned in said circulation system downstream of said outlet conduit operable to detect static pressures within said circulation system.

97. The apparatus of claim 92, further comprising a contaminant sensor positioned within the passenger compartment operable to detect contaminant levels within said vehicle.

98. The apparatus of claim 96, further comprising a bypass damper positioned in said bypass conduit operable to regulate flow of air through the bypass conduit in response to said pressure sensor, and a first controller responsive to said pressure sensor to operate said bypass damper.

99. The apparatus of claim 92, further comprising a flow damper positioned in said inlet or outlet conduit manually operable from said passenger compartment to regulate flow of air through said treating module.

100. The apparatus of claim 92 wherein the decontaminant comprises a particulate decontaminant.

101. The apparatus of claim 92 wherein the decontaminant comprises an odor-reducing decontaminant.

102. The apparatus of claim 92 wherein at least one decontaminant comprises an adsorbent.

103. The apparatus of claim 92 wherein at least one decontaminant comprises an oxidizing agent.

104. The apparatus of claim 92 wherein at least one decontaminant comprises an electrostatic or ionization filter.

105. The apparatus of claim 92 wherein there are a plurality of decontaminants arranged to contact the air flow in sequence.

106. The apparatus of claim 105 wherein the decontaminants are disposed in annular chambers.

107. The apparatus of claim 105 wherein the decontaminants are disposed in series.

108. The apparatus of claim 58, wherein the inlet conduit is adapted to be positioned downstream of the blower, and the outlet conduit is adapted to be positioned upstream of the blower.

109. Apparatus for removing contaminants from the air circulation system of a vehicle which circulates air to the passenger compartment of the vehicle comprising:

a blower positioned within said air circulation system;

supply and return ducts connecting said blower to the passenger compartment;

an untreated air inlet conduit adapted to be connected into said circulation system downstream of said blower, and a treated air outlet conduit adapted to be connected into said circulation system upstream of said blower;

a treating module connected to said inlet conduit and said outlet conduit for treating air flowing there through;

at least one air decontaminant disposed within said treating module to contact air flowing through the treating module; and a bypass conduit interconnecting said inlet and outlet conduits, wherein said bypass conduit is in parallel.

110. The apparatus of claim 109, wherein the inlet and outlet conduits are positioned within a return duct from the passenger compartment.

111. The apparatus of claim 109, wherein the inlet and outlet conduits are positioned within a supply duct to the passenger compartment.

112. The apparatus of claim 109, wherein the inlet conduit is positioned within a return duct and the outlet conduit is positioned within a supply duct.

113. The apparatus of claim 109, further comprising a pressure sensor positioned in said circulation system downstream of said outlet conduit operable to detect static pressures within said circulation system.

114. The apparatus of claim 109, further comprising a contaminant sensor positioned within the passenger compartment operable to detect contaminant levels within said vehicle.

115. The apparatus of claim 113, further comprising a bypass damper positioned in said bypass conduit operable to regulate flow of air through the bypass conduit in response to said pressure sensor, and a first controller responsive to said pressure sensor to operate said bypass damper.

116. The apparatus of claim 109, further comprising a flow damper positioned in said inlet or outlet conduit manually operable from said passenger compartment to regulate flow of air through said treating module.

117. The apparatus of claim 109 wherein the decontaminant comprises a particulate decontaminant.

118. The apparatus of claim 109 wherein the decontaminant comprises an odor-reducing decontaminant.

119. The apparatus of claim 109 wherein at least one decontaminant comprises an adsorbent.

120. The apparatus of claim 109 wherein at least one decontaminant comprises an oxidizing agent.

121. The apparatus of claim 109 wherein at least one decontaminant comprises an electrostatic or ionization filter.

122. The apparatus of claim 109 wherein there are a plurality of decontaminants arranged to contact the air flow in sequence.

123. The apparatus of claim 122 wherein the decontaminants are disposed in annular chambers.

124. The apparatus of claim 122 wherein the decontaminants are disposed in series.

* * * * *